US011406959B2

(12) United States Patent
Zhang et al.

(10) Patent No.: US 11,406,959 B2
(45) Date of Patent: Aug. 9, 2022

(54) MICRO-INTERFACE STRENGTHENING REACTION SYSTEM AND METHOD FOR PREPARING POLYETHYLENE BY USING A SOLUTION PROCESS

(71) Applicant: NANJING YANCHANG REACTION TECHNOLOGY RESEARCH INSTITUTE CO., LTD., Nanjing (CN)

(72) Inventors: Zhibing Zhang, Nanjing (CN); Zheng Zhou, Nanjing (CN); Feng Zhang, Nanjing (CN); Lei Li, Nanjing (CN); Weimin Meng, Nanjing (CN); Baorong Wang, Nanjing (CN); Gaodong Yang, Nanjing (CN); Huaxun Luo, Nanjing (CN); Guoqiang Yang, Nanjing (CN); Hongzhou Tian, Nanjing (CN); Yu Cao, Nanjing (CN)

(73) Assignee: NANJING YANCHANG REACTION TECHNOLOGY RESEARCH INSTITUTE CO., LTD., Nanjing (CN)

( * ) Notice: Subject to any disclaimer, the term of this patent is extended or adjusted under 35 U.S.C. 154(b) by 0 days.

(21) Appl. No.: 17/617,950

(22) PCT Filed: Jun. 18, 2020

(86) PCT No.: PCT/CN2020/096738
§ 371 (c)(1),
(2) Date: Dec. 10, 2021

(87) PCT Pub. No.: WO2021/253311
PCT Pub. Date: Dec. 23, 2021

(65) Prior Publication Data
US 2022/0203317 A1 Jun. 30, 2022

(30) Foreign Application Priority Data
Jun. 17, 2020 (CN) .......................... 202010554105.7

(51) Int. Cl.
*B01J 19/24* (2006.01)
*B01J 8/00* (2006.01)
(Continued)

(52) U.S. Cl.
CPC ........... *B01J 19/2465* (2013.01); *B01J 8/006* (2013.01); *B01J 8/0242* (2013.01); *B01J 19/245* (2013.01); *C08F 2/01* (2013.01); *C08F 10/02* (2013.01)

(58) Field of Classification Search
CPC ...... B01J 19/245; B01J 19/2465; B01J 8/006; B01J 4/001; C08F 2/01; C08F 10/02
See application file for complete search history.

(56) References Cited

U.S. PATENT DOCUMENTS

2011/0300024 A1* 12/2011 Hassan .................. C08F 10/00
422/131

FOREIGN PATENT DOCUMENTS

| CN | 101613426 A | 12/2009 |
| CN | 210045215 U | 2/2020 |

* cited by examiner

*Primary Examiner* — Lessanework Seifu

(57) ABSTRACT

A micro-interface strengthening reaction system and method for preparing polyethylene by using a solution process are provided. The system includes a pre-polymerization reactor and a polymerization reactor connected in sequence. The pre-polymerization reactor is provided with a pre-polymerization micro-interface generators, and the polymerization reactor is provided with a micro-interface generator. The system further includes a desolvation tower for removing solvents and impurities from the polyethylene product. A polyethylene inlet is disposed at a middle part of the desolvation tower, and the polyethylene inlet is connected with the flash tank bottom outlet. A nitrogen micro-interface generator for dispersing and breaking high-temperature nitrogen into micro-bubbles is disposed within the desolva- (Continued)

tion tower. Through installing the micro-interface generators on the pre-polymerization reactor and the micro-interface and on the polymerization reactor, the mass transfer area between gas phase and liquid phase is increased, the reaction efficiency is improved, and energy consumption is reduced.

8 Claims, 1 Drawing Sheet

(51) Int. Cl.
*C08F 2/01* (2006.01)
*B01J 8/02* (2006.01)
*C08F 10/02* (2006.01)

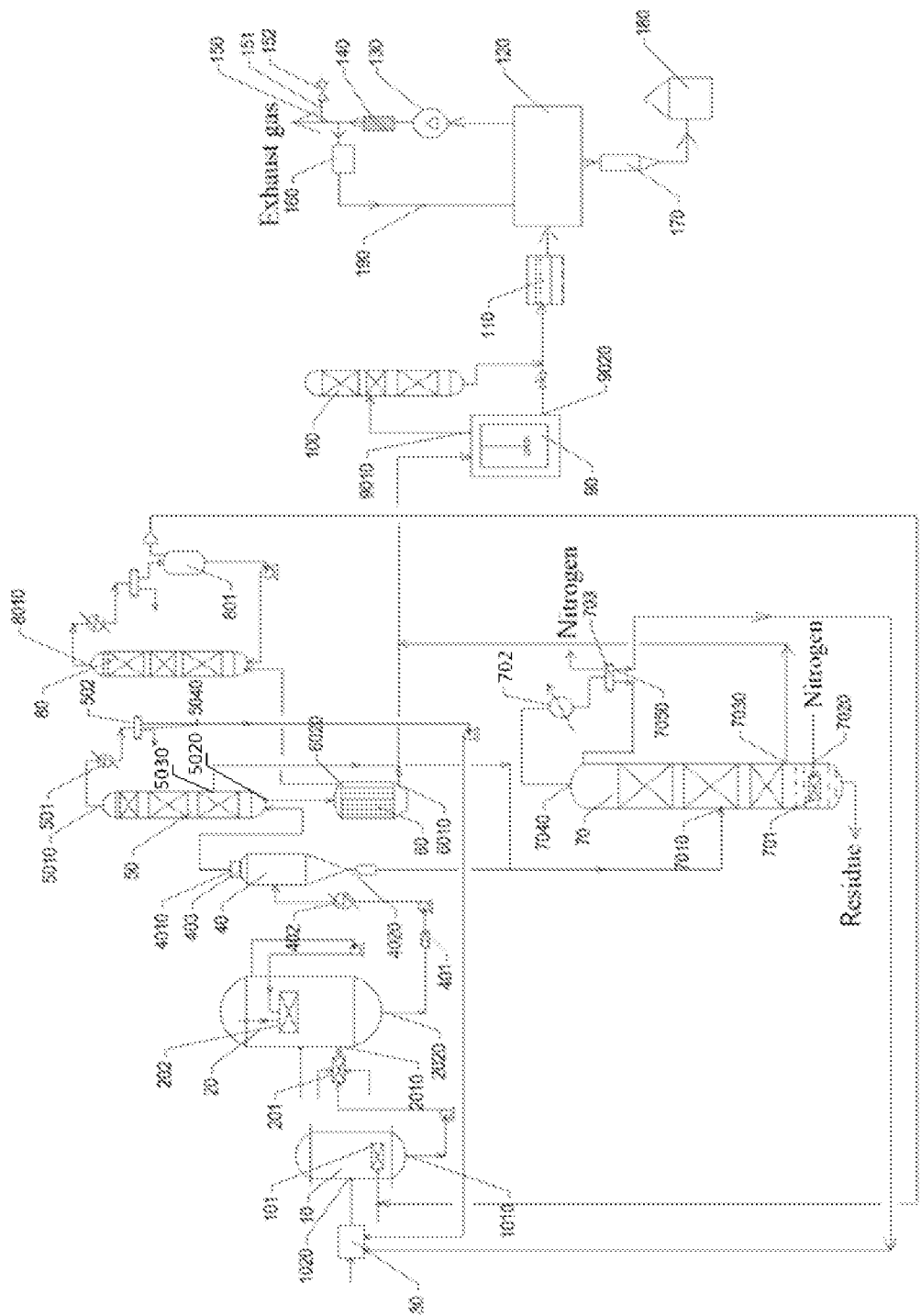

MICRO-INTERFACE STRENGTHENING REACTION SYSTEM AND METHOD FOR PREPARING POLYETHYLENE BY USING A SOLUTION PROCESS

TECHNICAL FILED

The invention relates to the technical field of preparing polyethylene, in particular, to a micro-interface strengthening reaction system and method for preparing polyethylene by using a solution process.

BACKGROUND OF THE APPLICATION

At present, polyethylene is a thermoplastic resin prepared by polymerizing ethylene. In industry, polyethylene also includes a copolymer of ethylene and a small amount of α-olefins. Polyethylene is odorless, non-toxic and feels like wax, has an excellent resistance to low temperature, has a minimum use temperature of reaching −100° C.-70° C., has good chemical stability, can resist the erosion of most acids and bases, is insoluble in a common solvent at room temperature, has a small water absorption, and has good electrical insulation property. There have been twenty technological routes for producing polyethylene for decades, and various technological techniques can be divided into solution process, slurry process (also called solvent process), bulk process, bulk and gas phase process, and gas phase process according to the polymerization type.

Currently, the solution process is mainly used for producing special-band PP woven bags having lower modulus and higher toughness compared with the PP woven bags made by slurry process. A solution process generally uses a stirred bed reactor, a kettle reactor, a tubular reactor and a tower reactor as a polymerization reactor. However, the interfacial area and mass transfer coefficient provided by the solution process are limited, and the utilization rate of gas is low, so that the reaction efficiency is relatively low. Therefore, it is relatively difficult to obtain an improvement in the reactivity, thereby affecting the overall efficiency of the reaction. In addition, because the mixing between the gas-liquid phase and the liquid-liquid phase is not uniform, the molecular weight distribution is also not uniform, and obtained polyethylene does not have a high uniformity, thereby affecting the product quality.

SUMMARY

In view of this, the present invention provides a micro-interface strengthening reaction system and method for preparing polyethylene by using a solution process. A first objective of the present invention is to provide a micro-interface strengthening reaction system for preparing polyethylene by using a solution process. In the micro-interface strengthening reaction system, a micro-interface generator is disposed on a pre-polymerization reactor, and a micro-interface generator is disposed on the polymerization reactor. On one hand, the mass transfer area between a gas phase and a liquid phase material is enlarged, the reaction efficiency is improved, and the energy consumption is reduced. On the other hand, the gas-liquid mixture is more uniform, and the obtained polyethylene has a higher uniformity, thereby improving the product quality.

A second objective of the present invention is to provide a reaction method for preparing polyethylene by using the solution process by adopting the abovementioned micro-interface strengthening reaction system, so as to obtain a polyethylene product having good quality and high yield.

In order to achieve the above objectives of the present invention, the following technical schemes are specially adopted.

A micro-interface strengthening reaction system for preparing polyethylene by using the solution process is disposed in the present invention, which includes a pre-polymerization reactor and a polymerization reactor which are connected in sequence, and a polyethylene circulation drying device for removing residual moisture in a material, wherein the pre-polymerization reactor is provided with a pre-polymerization micro-interface generator for dispersing and breaking the material into micro-bubbles, and the polymerization reactor is provided with a micro-interface generator for dispersing and breaking the material into micro-bubbles. A polymerization reaction product outlet is disposed at the bottom of the polymerization reactor, and the polymerization reaction product outlet is connected to a flash tank for flashing a polymerization reaction product; a flash tank bottom outlet for discharging a polyethylene product is disposed at the bottom of the flash tank; the flash tank bottom outlet is connected to a desolvation tower for removing solvents and impurities from the polyethylene product, a nitrogen micro-interface generator for dispersing and breaking high-temperature nitrogen into micro-bubbles is disposed within the desolvation tower, a product outlet is disposed on a side wall of the desolvation tower, and the product outlet is connected to a steamer tank for decomposing a catalyst in a polymer; and a material outlet is disposed on a side wall of the steamer tank, and the material outlet is connected to a water strainer for preliminarily removing moisture of the material. The polyethylene circulation drying device includes a drying box, an air pump, an electric heater and a circulation pipe, an inlet and an outlet of the circulation pipe are respectively connected to the top of the drying box, a gas pump and an electrothermal heater are sequentially disposed on the circulation pipe in an inlet direction of the circulation pipe, and the water strainer is connected to the drying box.

Further, a buffer tank for ensuring a stable circulation gas flow rate on a pipeline is further disposed on the circulation pipe, and the buffer tank is disposed close to the outlet of the circulation pipe.

Further, the circulation pipe is connected with an exhaust branch pipe, a pressure relief pipe is disposed on one side of the exhaust branch pipe, and a pressure relief valve is disposed on the pressure relief pipe.

Further, the drying box is connected with a hopper, the hopper is used for collecting polyethylene, and the hopper is connected with a collection box.

Further, a gas phase outlet is disposed at the top of the flash tank, and the material from the gas phase outlet is introduced into a pre-washing tower for washing and removing impurities.

Further, a polyethylene powder outlet is disposed at the bottom of the pre-washing tower, and the polyethylene powder outlet is connected with a bag filter for separating polyethylene powder.

Further, the mixture outlet is connected with the steamer tank for filtering out polyethylene powder to enter the steamer.

Further, the drying box and the circulation pipe are filled with an inert gas.

A micro-interface strengthening reaction method for preparing polyethylene by using the solution process, including the following steps:

after ethylene is dispersed and broken into micro-bubbles, performing a pre-polymerization reaction in the presence of a catalyst, so as to obtain a prepolymer;

polymerizing the prepolymer with ethylene and hydrogen which are dispersed and broken into micro-bubbles, so as to obtain a product; and performing flashing, washing and removing impurities, removing solvents and impurities, steaming, water straining and drying on the product.

Further, a polymerization reaction temperature is 130-145° C., and a polymerization reaction pressure is 2-2.5 MPa.

It can be understood by a person skilled in the art that the micro-interface generator used in the present invention is embodied in the prior patents of the present inventor, such as patents of application numbers CN201610641119.6, CN 201610641251.7, CN 201710766435.0, CN 106187660, CN 105903425 A, CN 109437390 A, CN 205831217 U and CN 207581700 U. The specific product structure and operation principle of a micro-bubble generator (i.e. a micro-interface generator) are introduced in detail in the earlier patent CN 20161064119.6, and the present application document discloses that "the micro-bubble generator comprises a body and a secondary breaking member, a cavity is disposed in the body, an inlet in communication with the cavity is disposed on the body, first and second ends which are opposite to each other of the cavity are open, and the cross-sectional area of the cavity decreases from the middle of the cavity to the first and second ends of the cavity; the secondary breaking member is disposed on at least one of the first and second ends of the cavity, a part of the secondary breaking member is disposed in the cavity, and an annular channel is formed between the secondary breaking member and through holes which are open at two ends of the cavity; and the micro-bubble generator further comprises an inlet pipe and an inlet pipe". It can be determined from the specific structure disclosed in the application document that the specific operation principle thereof is as follows: a liquid tangentially enters a micro-bubble generator by means of a liquid inlet pipe, and the gas is rotated and cut at an ultra-high speed, so that the gas bubbles are broken into micron-scale micro-bubbles, thereby improving the mass transfer area between a liquid phase and a gas phase; in addition, the micro-bubble generator in the present patent belongs to an air-operated micro-interfacial generator.

In addition, it is disclosed in the earlier patent 201610641251.7 that the primary bubble breaker has a circulating liquid inlet, a circulating gas inlet and a gas-liquid mixture outlet, and the secondary bubble breaker is in communication with the feeding inlet with the gas-liquid mixture outlet, which indicates that the bubble breaker needs gas-liquid mixture to enter. In addition, it can be determined from the following figures that the primary bubble breaker mainly uses the circulating liquid as a motive power, and thus the primary bubble breaker belongs to a hydraulic micro-interface generator, and the secondary bubble breaker simultaneously introduces the gas-liquid mixture into an ellipsoidal rotary ball to rotate, thereby achieving bubble breaking during the process of rotation, and therefore the secondary bubble breaker actually belongs to a gas-liquid linkage micro-interface generator. In fact, either a hydraulic micro-interface generator or a gas-liquid linkage micro-interface generator is a specific form of the micro-interface generator. However, the micro-interface generator used in the present invention is not limited to the abovementioned forms, and the specific structure of the bubble breaker disclosed in the previous patent is only one form of the micro-interface generator of the present invention which can be used.

In addition, the earlier patent 201710766435.0 discloses that "the principle of the bubble breaker is high-speed jet to achieve gas collision with each other", and also states that the bubble breaker can be used in a micro-interface strengthening reactor to prove the correlation between the bubble breaker and the micro-interface generator. Furthermore, in the earlier patent CN 106187660, there is also a related disclosure of the specific structure of the bubble breaker. For details, see paragraphs [0031]-[0041] in the description and the FIGURE, the specific operation principle of the bubble breaker S-2 is abovementioned in detail. The top of the bubble breaker is a liquid inlet, the side face thereof is a gas inlet, and the liquid phase entering from the top provides a winding power, so as to achieve the effect of breaking into ultra-fine bubbles. In the FIGURE, it can also be determined that the bubble breaker is in a conical structure, and the diameter of the upper portion is larger than that of the lower portion, and the winding power can also be provided better for the liquid phase.

As the micro-interface generator has just been developed at the early stage of the prior patent application, it's named as a micro-bubble generator (CN201610641119.6), a bubble breaker (201710766435.0) in the early stage. With continuous technological improvement, the micro-interface generator is named later, and the micro-interface generator in the present invention is equivalent to the previous micro-bubble generator, bubble breaker, etc., but the names thereof are different.

In conclusion, the micro-interface generator of the present invention belongs to the prior art. Although some bubble breakers belong to a type of a pneumatic bubble crusher, some bubble crushers belong to a type of a hydraulic bubble crusher, and some bubble crushers belong to a type of gas-liquid linkage bubble breaker, the difference between these types is mainly selected according to different operation conditions. In addition, with regard to the connection between the micro-interface generator and the reactor and other devices, the micro-interface generator comprises connection structures and connection positions, which are determined according to the structure of the micro-interface generator, and are not limited thereto.

Compared with the prior art, the beneficial effects of the present invention are: in the micro-interface strengthening reaction system for preparing polyethylene by using a solution process of the present invention, a micro-interface generator is disposed on a pre-polymerization reactor, and a micro-interface generator is disposed on the polymerization reactor, on the one hand, the mass transfer area between a gas phase and a liquid phase material is increased, the reaction efficiency is improved, and the energy consumption is reduced; on the other hand, the gas-liquid mixture is more uniform, and the obtained polyethylene has a higher uniformity, thereby improving the product quality.

BRIEF DESCRIPTION OF DRAWINGS

By reading the detailed description of the preferred embodiments below, various other advantages and benefits will become clear to those of ordinary skill in the art. The drawings are only used for the purpose of illustrating the preferred embodiments, and are not considered as a limitation to the invention. Also, throughout the drawings, the same reference numerals are used to denote the same components. In the drawings:

FIG. 1 is a structural diagram of a reaction system for preparing polyethylene by using a solution process according to an embodiment of the present invention.

DETAIL DESCRIPTION

In order to make the purpose and advantages of the invention clearer, the invention will be further abovementioned below in conjunction with the embodiments. It should be understood that the specific embodiments mentioned here are only used to explain the invention, and are not used to limit the invention.

Hereinafter, exemplary embodiments of the present invention will be described in more details with reference to the accompanying drawings. Although the drawings show exemplary embodiments of the present invention, it should be understood that the present invention can be implemented in various forms and should not be limited by the embodiments set forth herein. On the contrary, these embodiments are provided to enable a more thorough understanding of the present invention and to fully convey the scope of the present invention to those skilled in the art. I should be noted that the embodiments of the present invention and features in the embodiment can be combined with each other if there is not conflict. Hereinafter, the present invention will be described in details with reference to the drawings and in conjunction with the embodiments.

It should be understood that in the description of the invention, orientations or position relationships indicated by terms upper, lower, front, back, left, right, inside, outside and the like are orientations or position relationships are based on the direction or position relationship shown in the drawings, which is only for ease of description, rather than indicating or implying that the device or element must have a specific orientation, be constructed and operated in a specific orientation, and therefore cannot be understood as a limitation of the invention. In addition, the terms "first", "second", and "third" are only used for descriptive purposes, and cannot be understood as indicating or implying relative importance.

Further, it should also be noted that in the description of the invention, terms "mounting", "connected" and "connection" should be understood broadly, for example, may be fixed connection and also may be detachable connection or integral connection; may be mechanical connection and also may be electrical connection; and may be direct connection, also may be indirection connection through an intermediary, and also may be communication of interiors of two components. Those skilled in the art may understand the specific meaning of terms in the invention according to specific circumstance.

In order to explain the technical schemes of the present invention more clearly, the following description will be given in the form of specific embodiments.

Embodiment

Referring to FIG. 1, a reaction system for preparing polyethylene by using a solution process according to an embodiment of the present invention is shown. The reaction system includes a pre-polymerization reactor 10 and a polymerization reactor 20, and a polyethylene circulation drying device for removing residual moisture in a material. A pre-polymerization micro-interface generator 101 for dispersing and breaking a material into small droplets is disposed inside the pre-polymerization reactor 10. A wall surface of the pre-polymerization reactor 10 penetrated by an ethylene delivery pipeline is connected to the pre-polymerization micro-interface generator 101 for introducing ethylene into the pre-polymerization micro-interface generator. The polymerization reactor 20 is provided with a micro-interface generator for dispersing fractured materials into small droplets.

It should be emphasized that the micro-interface generator includes a first micro-interface generator 201 and a second micro-interface generator 202, the first micro-interface generator 201 is disposed outside the polymerization reactor 20, the second micro-interface generator 202 is disposed inside the polymerization reactor 20, and the first micro-interface generator 201 is introduced into the polymerization reactor 20 so as to obtain a prepolymer. Specifically, a prepolymer outlet 1010 is disposed at the bottom of the pre-polymerization reactor 10, a feed inlet 2010 is disposed on the side wall of the polymerization reactor 20. One end of the first micro-interface generator 201 is connected to the feed inlet 2010, and the other end of the first micro-interface generator is connected to the prepolymer outlet 1010. The second micro-interface generator 202 is connected to a gas phase pipeline for gas recovery above the liquid level of the polymerization reactor 20 and a liquid phase circulation pipeline for boosting the power of the second micro-interface generator 202. One end of the liquid phase circulation pipeline is connected to a side wall of the polymerization reactor 20, and the other end of the liquid phase circulation pipeline is connected to the second micro-interface generator 202.

In this embodiment, a mixed solvent inlet 1020 is disposed on the side wall of the pre-polymerization reactor 10, the mixed solvent inlet 1020 is connected to a pre-mixing tank 30, and the pre-mixing tank 30 is used for pre-mixing a material, a catalyst and a solvent. By means of pre-mixing, the reaction material, the catalyst and the solvent can be uniformly mixed, and the reaction center of the catalyst is activated. An automatic stirring mechanism is disposed inside the pre-mixing tank 30, and the mixture is mixed more uniformly by further stirring.

Further, a polymerization reaction product outlet 2020 is disposed at the bottom of the polymer reactor 20, and the polymerization reaction product outlet 2020 is connected to a flash tank 40 for flashing the polymerization reaction product. The pipeline connecting the polymerization reaction product outlet 2020 to the flash tank 40 is successively provided with a pressure relief valve 401 and a heater 402, and heating is performed before flashing, thereby improving the flashing efficiency. The pressure relief valve 401 is preferably a thin film-type pressure relief valve. Compared with other pressure reducing valves, the diaphragm of the thin film-type pressure relief valve is more sensitive to pressure and has accuracy up to ±1%.

Specifically, a power separator 403 is disposed at the top of flash tank 40 for separating the polyethylene powder from the gas phase material as far as possible. As gas processed from the top of the flash tank 40 needs to be recycled and used, and there is little or no powder entrainment as far as possible, a power separator 403 is disposed at the outlet at the top of the flash tank 40, so that most of the powder can remain in the flash tank 40, thereby improving the separation efficiency of the flash tank 40.

Further, a flash tank bottom outlet 4020 for discharging a polyethylene product is further disposed at the bottom of the flash tank 40, a gas phase outlet 4010 is disposed at the top of the flash tank 40, and the material coming out of the gas phase outlet 4010 is introduced into the pre-washing tower 50 for washing and removing impurities. Specifically, a gas phase ethylene outlet 5010 is disposed at the top of the pre-washing tower 50, and the gas phase ethylene outlet 5010 is connected to a second condenser 501 and a second condensate storage tank 502 in sequence. The second condensate storage tank 502 is connected to the pre-mixing tank 30 for reuse of ethylene. The gas phase ethylene coming out of the top of the pre-washing tower 50 is cooled by the second condenser 501 and then enters the second condensate storage tank 502. A production line is disposed at one side of the bottom of the second condenser storage tank 502. As the gas phase ethylene includes a certain amount of ethane, and ethane is an inert component which does not participate in the reaction, and after repeated recovery and accumulation, the amount of ethane will become larger and larger. Therefore, the remaining ethylene needs to be continuously excluded, and is re-returned to the pre-mixing tank 30 for reuse after being cooled, thereby saving resources. An appropriate amount of extraction outlet 5040 is disposed at the bottom of the second condenser storage tank 502, and a polyethylene solution outlet 5030 is disposed on the side wall of the pre-washing tower 50. A polyethylene powder outlet 5020 is disposed at the bottom of the pre-washing tower 50. A polyethylene powder outlet 5020 is connected to a bag filter 60 for separating polyethylene powder.

Specifically, a mixture outlet 6010 is disposed at the bottom of the bag filter 60, and a second vapor outlet 6020 is disposed at the top of the bag filter. A second vapor outlet 6020 is connected to the bottom of the low pressure ethylene washing tower 80 for recovering gas phase ethylene. A third vapor outlet 8010 is disposed at the top of the low pressure ethylene washing tower 80. A mist separator 801 is connected to the vapor outlet 8010 for removing impurities from the recovered gas phase ethylene. The ethylene gas from the top of the mist separator 801 returns to the pre-polymerization micro-interface generator 101 for reuse.

In this embodiment, a desolvation tower 70 is further included. The desolvation tower 70 is used for removing solvates and impurities from the polyethylene product. A polyethylene inlet 7010 is disposed in the middle of the desolvation tower 70. The polyethylene inlet 7010 is connected to both the flash tank bottom outlet 4020 and polyethylene solution outlet 5030. The flash tank bottom outlet 4020 is in communication with the polyethylene solution outlet 5030 for the two-way pipeline material to merge and then enter the desolvation tower 70 for removing solvents and impurities. A nitrogen micro-interface generator 701 for dispersing micro-bubbles broken up into high-temperature nitrogen is disposed inside the desolvation tower 70. A gas inlet 7020 is disposed on the side wall of the desolvation tower 70. The gas inlet 7020 is connected to the nitrogen micro-interface generator 701 by means of a pipeline for delivering high-temperature nitrogen into the nitrogen micro-interface generator 701.

Further, a low boiling point solvent outlet 7040 is disposed at the top of the desolvation tower 70. The low boiling point solvent outlet 7040 is connected to a first condenser 702 and a first condensate storage tank 703 in sequence. A backflow liquid outlet is disposed at the bottom of the first condensate storage tank 703, and the backflow liquid outlet is connected to the top of the desolvation tower 70 for back flowing at the top of the tower. A condensate outlet 7050 is also disposed at the bottom of the first condensate storage tank 703. The condensate outlet 7050 is connected to the bottom of the pre-mixing tank 30 for reusing the condensed solvent. A nitrogen gas outlet is further disposed at the top of the first condensation liquid storage tank 703 for recovering nitrogen. A residue outlet is further disposed at the bottom of the desolvation tower for discharging small amounts of high boiling solvents and catalyst.

In this embodiment, a product outlet 7030 is disposed on the side wall of the desolvation tower 70 for dehydrating the polyethylene output after the removal of impurities. The product outlet 7030 and the mixture outlet 6010 are both connected to a steamer tank 90 for separating the catalyst in the polymer. Specifically, a first vapor outlet 9010 is further disposed at the top of the steamer tank 90. The gas coming out of the first vapor outlet 9010 enters the polyethylene washing tower 100 for recovering small amounts of polyethylene powder entrained in the vapor.

Further, a material outlet 9020 is disposed on a side wall of the steamer tank 90. The material outlet 9020 is connected to a water strainer 110 for preliminarily removing water. The water strainer 110 is connected to the bottom of the polyethylene washing tower 100, and is used for merging and aggregating polyethylene powder washed out from the bottom of the polyethylene washing tower 100 and polyethylene coming out of a material outlet 9020, and then entering the water exchanger 110 for preliminarily removing water. The water strainer 110 is connected to a polyethylene circulation drying device for removing residual moisture from the material.

Specifically, the polyethylene circulation drying device includes a drying box 120, a gas pump 130, an electrothermal heater 140 and a circulation pipe 190. An inlet and an outlet of the circulation pipe 190 are respectively connected to the top of the drying box 120, and a gas pump 130 and an electrothermal heater 140 are disposed on the circulation pipe 190 in sequence in an inlet direction of the circulation pipe 190. The water strainer 110 is connected to the drying box 120. The circulation pipe 190 is further provided with a buffer tank 160 for ensuring a stable circulation air flow rate on the pipeline. The buffer tank 160 is arranged close to the outlet of the circulation pipe 190. An exhaust manifold 150 is connected to the circulation pipe 190. A pressure relief pipe 151 is disposed at one side of the exhaust manifold 150. A pressure relief valve 152 is disposed on the pressure relief pipe 151.

In the above embodiment, a hopper 170 is further included. The hopper 170 is connected to the bottom of the drying box for collecting polyethylene; and the bottom of the hopper 170 is connected to a collection tank 180 for polyethylene from the bottom of the hopper to enter the collection tank 180 for collection. The operation process and principle of the reaction system for preparing polyethylene by using the solution process of the present invention are briefly described below.

First, the material, catalyst and solvent are pre-mixed in a pre-mixing tank 30 and then introduced into a pre-polymerization reactor 10, and the ethylene gas is introduced into a pre-polymerization micro-interface generator 101 and is dispersed and broken into small droplets, and the dispersed and broken ethylene and the pre-mixture are fully emulsified and then subjected to a pre-polymerization reaction so as to obtain a prepolymer. The prepolymer is introduced into a first micro-interface generator 201, sufficiently emulsified with ethylene and hydrogen introduced at the same time and then introduced into a polymerization reactor 20 for polymerization. The polymerization reaction occurred in the polymerization reactor 20 is at a temperature of 130-145° C. and a pressure of 2-2.5 MPa. The polymerization product subsequently enters a flash tank 40 for flashing and removing impurities. The gas phase from the top of the flash tank 40 enters a pre-washing tower 50 for washing and removing impurities. The gas phase ethylene from the top of the pre-washing tower 50 is condensed and then returned to the pre-mixing tank 30 for recycling. The polyethylene solution taken from the side wall of the pre-washing tower 50 and the viscous liquid from the bottom of the flash tank 40 are collected and then introduced into a desolvation tower 70 for removing solvents and impurities; the polyethylene powder at the bottom of the pre-washing tower 50 enters a bag filter 60 for filtering so as to obtain polyethylene powder. The polyethylene coming out from the side wall of the desolvation tower 70 and the polyethylene powder are merged and then introduced into the steamer tank 90 for steaming. The steamed product is introduced into a polyethylene washing tower 100 for washing, and then enters the water strainer 110 for removing the remaining water, then is connected to a polyethylene circulation drying device to remove the remaining water in the material; and the polyethylene product after removing the water enters the hopper 170 and then enters the collection box 180.

Therefore, in the micro-interface strengthening reaction system for preparing polyethylene by using the solution process of the present invention, a micro-interface generator is disposed on a pre-polymerization reactor, and a micro-interface generator is disposed on the polymerization reactor. On the one hand, the mass transfer area between a gas phase and a liquid phase material is increased, the reaction efficiency is improved, and the energy consumption is reduced. On the other hand, the gas-liquid mixture is more uniform, and the obtained polyethylene has a higher uniformity, thereby improving the product quality.

So far, the technical solution of the invention has been abovementioned in conjunction with the preferred embodiments shown in the drawings. However, it is easily understood by those skilled in the art that the protection scope of the invention is obviously not limited to these specific embodiments. Without departing from the principle of the invention, those skilled in the art can make equivalent changes or substitutions to the relevant technical features, which will fall into the protection scope of the invention. The above are only preferred embodiments of the invention rather than limits to the invention. Those skilled in the art may make various modifications and changes to the invention. Any modification, equivalent replacement, improvement and the like made within the spirit and principle of the invention all should be included in the protection scope of the invention.

The invention claimed is:

1. A micro-interface strengthening reaction system for preparing polyethylene by using a solution process, comprising:
a pre-polymerization reactor and a polymerization reactor which are connected in sequence, and a polyethylene circulation drying device for removing residual moisture in a material, wherein the pre-polymerization reactor is provided with a pre-polymerization micro-interface generator for dispersing and breaking the material into micro-bubbles, and the polymerization reactor is provided with a micro-interface generator for dispersing and breaking the material into micro-bubbles;
the micro-interface generator of the polymerization reactor comprises a first micro-interface generator and a second micro-interface generator, the first micro-interface generator is disposed outside the polymerization reactor, the second micro-interface generator is disposed inside the polymerization reactor, and the first micro-interface generator is introduced into the polymerization reactor so as to obtain a prepolymer;
a prepolymer outlet is disposed at the bottom of the pre-polymerization reactor, a feed inlet is disposed on the side wall of the polymerization reactor; one end of the first micro-interface generator is connected to the feed inlet, and a second end of the first micro-interface generator is connected to the prepolymer outlet; the second micro-interface generator is connected to a gas phase pipeline for gas recovery above the liquid level of the polymerization reactor and a liquid phase circulation pipeline for boosting the power of the second micro-interface generator; one end of the liquid phase circulation pipeline is connected to a side wall of the polymerization reactor, and a second end of the liquid phase circulation pipeline is connected to the second micro-interface generator;
a polymerization reaction product outlet is disposed at the bottom of the polymerization reactor, and the polymerization reaction product outlet is connected to a flash tank for flashing a polymerization reaction product; a flash tank bottom outlet for discharging a polyethylene product is disposed at the bottom of the flash tank; the flash tank bottom outlet is connected to a desolvation tower for removing solvents and impurities from the polyethylene product, a nitrogen micro-interface generator for dispersing and breaking high-temperature nitrogen into micro-bubbles is disposed within the desolvation tower, a product outlet is disposed on a side wall of the desolvation tower, and the product outlet is connected to a steamer tank for decomposing a catalyst in a polymer; and a material outlet is disposed on a side wall of the steamer tank, and the material outlet is connected to a water strainer for preliminarily removing moisture of the material;
the polyethylene circulation drying device comprises a drying box, an air pump, an electric heater and a circulation pipe, an inlet and an outlet of the circulation pipe are respectively connected to the top of the drying box, a gas pump and an electrothermal heater are sequentially disposed on the circulation pipe in an inlet direction of the circulation pipe, and the water strainer is connected to the drying box;
wherein a method for preparing polyethylene by using the solution process being performed through the micro-interface strengthening reaction system comprises the following steps:
after ethylene is dispersed and broken into micro-bubbles, performing a pre-polymerization reaction in the presence of a catalyst, so as to obtain a prepolymer;
polymerizing the prepolymer with ethylene and hydrogen which are dispersed and broken into micro-bubbles, so as to obtain a product; and
performing flashing, washing and removing impurities, removing solvents and impurities, steaming, water straining and drying on the product;
wherein a polymerization reaction temperature is 130-145° C., and a polymerization reaction pressure is 2-2.5 MPa.

2. The micro-interface strengthening reaction system for preparing polyethylene by using the solution process according to claim 1, wherein a buffer tank for ensuring a stable circulation gas flow rate on a pipeline is further disposed on the circulation pipe, and the buffer tank is disposed adjacent to the outlet of the circulation pipe.

3. The micro-interface strengthening reaction system for preparing polyethylene by using a solution process according to claim 2, wherein the circulation pipe is connected with an exhaust branch pipe, a pressure relief pipe is disposed on one side of the exhaust branch pipe, and a pressure relief valve is disposed on the pressure relief pipe.

4. The micro-interface strengthening reaction system for preparing polyethylene by using the solution process according to claim 1, wherein the drying box is connected with a hopper, the hopper is used for collecting polyethylene, and the hopper is connected with a collection box.

5. The micro-interface strengthening reaction system for preparing polyethylene by using the solution process according to claim 1, wherein a gas phase outlet is disposed at the top of the flash tank, and the material from the gas phase outlet is introduced into a pre-washing tower for washing and removing impurities.

6. The micro-interface strengthening reaction system for preparing polyethylene by using a solution process according to claim 5, wherein a polyethylene powder outlet is disposed at the bottom of the pre-washing tower, and the polyethylene powder outlet is connected with a bag filter for separating polyethylene powder.

7. The micro-interface strengthening reaction system for preparing polyethylene by using the solution process according to claim 6, wherein a mixture outlet is connected with the steamer tank for filtering out polyethylene powder to enter the steamer.

8. The micro-interface strengthening reaction system for preparing polyethylene by using the solution process according to claim 1, wherein the drying box and the circulation pipe are filled with an inert gas.

* * * * *